United States Patent [19]

Stewart et al.

[11] Patent Number: 4,464,755
[45] Date of Patent: Aug. 7, 1984

[54] MEMORY SYSTEM WITH ERROR DETECTION AND CORRECTION

[75] Inventors: Roger G. Stewart, Neshanic Station; Andrew G. F. Dingwall, Bridgewater, both of N.J.

[73] Assignee: RCA Corporation, New York, N.Y.

[21] Appl. No.: 362,463

[22] Filed: Mar. 26, 1982

[51] Int. Cl.³ .............................................. G06F 11/10
[52] U.S. Cl. .................................................... 371/51
[58] Field of Search ............................. 371/51, 49, 50

[56] References Cited

U.S. PATENT DOCUMENTS

| | | | |
|---|---|---|---|
| 3,972,033 | 7/1976 | Cislaghi et al. | 371/51 X |
| 4,038,537 | 7/1977 | Cassarino, Jr. et al. | 371/51 |
| 4,044,328 | 8/1977 | Herff | 371/50 |
| 4,360,917 | 11/1982 | Sindelar et al. | 371/49 |

Primary Examiner—Charles E. Atkinson
Attorney, Agent, or Firm—Joseph S. Tripoli; George E. Haas; Henry I. Schanzer

[57] ABSTRACT

A memory system comprised of M memory modules where M−1 of the modules are for storing data bits and the Mth modules is for storing system parity bits corresponding to the data bits stored in the other M−1 modules. Each module has R·C bit locations organized into W internal words of L bits and includes a parity array for storing one parity bit for each internal word, where L is greater than 1, and RC=WL. Each module includes means for reading an internal word and for reading-out a particular subset of the L bits of that internal word. Each module includes means for checking the parity of a selected internal word and for producing a first parity signal indicating whether or not it is correct. The memory system includes means for checking the parity of the selected subsets read out from the M modules and for producing a system parity signal indicating whether the parity of the M subsets is correct. When the first parity signal and the system parity signals indicate the presence of parity errors the subset read out from a module whose first parity signal indicates the presence of a parity error is corrected.

13 Claims, 8 Drawing Figures

MEMORY SYSTEM WITH ERROR DETECTION AND CORRECTION

The Government has rights in this invention pursuant to contract No. DAAK 20-79-C-0276 awarded by the Department of the Army.

This invention relates to memory systems and to memory subsystems which include the capability to detect and correct errors.

In many data handling systems several semiconductor integrated circuits (IC's) defined herein as "subsystems" are interconnected to form a memory system. Each IC, or chip, may contain anywhere from 1K to more than 64K bits of information and is generally referred to as a large scale integrated (LSI) circuit or a very large scale integrated (VLSI) circuit.

The advent of LSI and VLSI circuits has introduced new problems in the areas of reliability and testability at the subsystem level. For example, to produce the desired high number of memory cells per IC, the memory cells are reduced in size. The resulting cells have smaller nodal capacitances which render them more susceptible to data upset by noise and radiation effects. Also, due to the smaller memory cells and larger bit line capacitances, smaller bit line signal swings are produced increasing the possibility of errors in reading (sensing) the stored information or in writing the desired information. Consequently, the probability of errors is significantly increased due to the large (and ever increasing) number of cells in each IC (i.e. subsystem) and to the increased number of sources of error. The probability of errors is compounded when several of these subsystems are combined to form a memory system.

The reliability of the memory system may be improved by using known error detection and correction circuitry. For example, large main frame computer systems may make use of Hamming or other high order error detecting and correcting codes to produce reliable and testable memory systems. However, the use of such codes is not efficient in medium sized memory systems because they add significantly to the memory overhead and to the circuit complexity, and limit the speed of operation of the memory systems. An object of the present invention is to provide fault detection and error correction circuitry suitable for a memory system, which does not add very much to the overhead or to the circuit complexity.

A memory system embodying the invention is comprised of M modules, each of which includes a memory array of R·C memory cells (e.g. 128 rows of cells by 128 columns of cells) which is internally partitioned into W internal words of L bits each, and which is organized for external read/write operations into a number X of Y bit outputs; where Y is an integer equal to or greater than one, where L is greater than Y, and RC=WL=XY. Each module includes means for reading-out a selected Y bit output and for concurrently reading the internal word which includes the selected Y bit output. Each module also includes a parity array for storing a parity bit for each internal word and means receptive of a selected internal word and its corresponding parity bit for ascertaining whether its parity is correct and for producing a first parity signal indicative thereof.

In the memory system M−1 of the modules are for data storage and the Mth module is for storing a system parity bit corresponding to the data bits stored in the other M−1 modules. The memory system includes means receptive of selected Y bit output read-out from the M modules for ascertaining whether the parity of the Y bit outputs read from the M modules is correct and for providing a second system parity signal indicative thereof. When the first and second parity signals indicate the existence of parity error in a selected internal word and a parity error in the system data word, the Y bit output corresponding to the faulty internal word is corrected. The first level (subsystem) and second level (system) parity signals may be used to provide a minimum of double error detection and single error correction. This approach offers low memory overhead, each of repair, flexibility, simplicity and very little limitation on speed of operation due to the simplicity of the parity checking mechanism. Invention resides in checking parity at the module and system level and using that information to correct faulty data bits. Invention also resides in the partitioning and organization of each module used to form the memory system.

In the accompanying drawing like reference characters denote like components, and FIG. 1 is a block diagram of a system embodying the invention;

Figure 1:
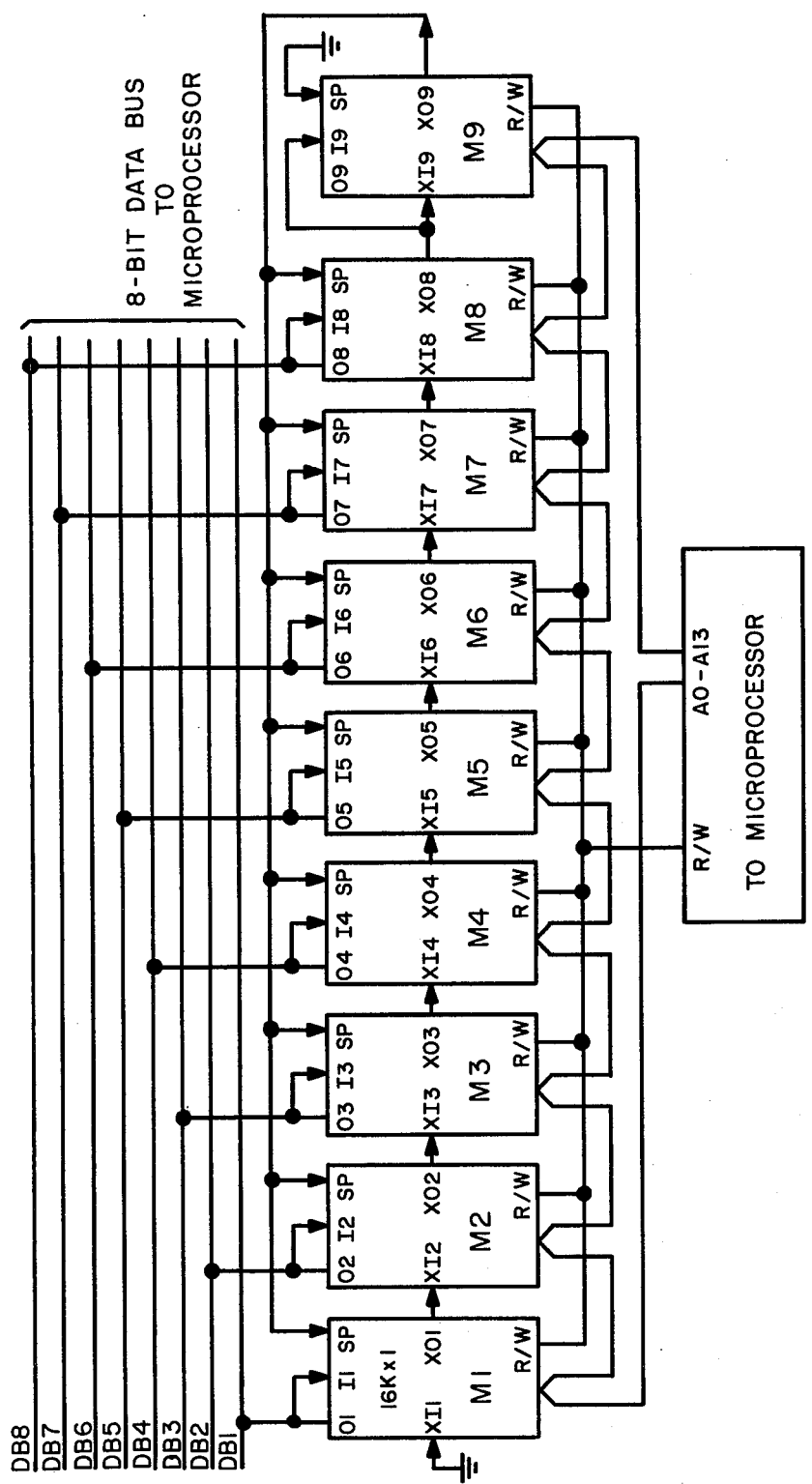

FIG. 1 is a block diagram of a fault tolerant 16K×8 (actually 16,384×8) memory system comprised of 8 memory chips (M1 through M8) and a "system parity" memory chip M9. The 9 chips (M1–M9) are identical to each other. Each chip (Mi) includes: a data input (Ii) pin; a data output (Oi) pin at which is read-out or produced a selected and, if necessary, "corrected" data bit stored within the memory; an (XIi) input pin for a signal XO(i−1) indicative of the parity of the data bit(s) of the preceding (i.e. lower numbered) chip(s); an (XOi) output pin for a signal indicative of the parity of the "raw" data bit of the chip in combination with the parity of the data bits of all preceding chips; a system parity (SP) input pin for a signal indicating whether or not a "system" parity error exists. [The reference character i is a variable corresponding to the number of the chip.] Each chip also includes a read/write (R/W) control pin whose applied signal determines whether a read or write operation is to occur, and 14 address inputs (i.e. $A_0$ through $A_{13}$) to enable the ultimate selection (or addressing) of a single bit location out of the 16,384 possible bit locations. The system parity signal is generated by checking the parity of a 9 bit system or data word (where the 9 bits are the "raw" Di outputs of chips M1–M9) and a system parity signal (XO9=SP) is produced to indicate whether the second level or system parity is correct. Actually, the parity of the 8 "raw" data bits read-out of chips M1 through M8 is compared with a corresponding parity bit stored in system parity chip M9 to produce the system parity signal. To simplify the illustration, certain pins (e.g. $V_{DD}$, ground) although present on each chip and needed for its operation are not shown.

In the system of FIG. 1, the output (Oi) pin of each chip M1 through M8 is connected to its Input (Ii) pin and to a corresponding data bit (DBi) line. The data bit lines, DB1 through DB8, form an 8 bit data bus which couples the memory system to a microprocessor (not shown). Except for the last chip, the XOi output of chip Mi is connected to the XI(i+1) input of chip M(i+1). The XI1 input of chip M1 is grounded ("0" level input). The XI9 input of chip M9 is connected to its input (I9) pin. The output (O9) pin of M9 is not connected to any data bus. The XO9 output of chip M9 is connected to the SP input of chips M1 through M8. The SP input of M9 is grounded ("0" level input). The significance of the simple connection of the XO pin of one chip to the XI (i+1) pin of the next chip, referred to herein as a "daisy chain" interconnection, to produce a system parity signal is discussed below.

Figure 2A:
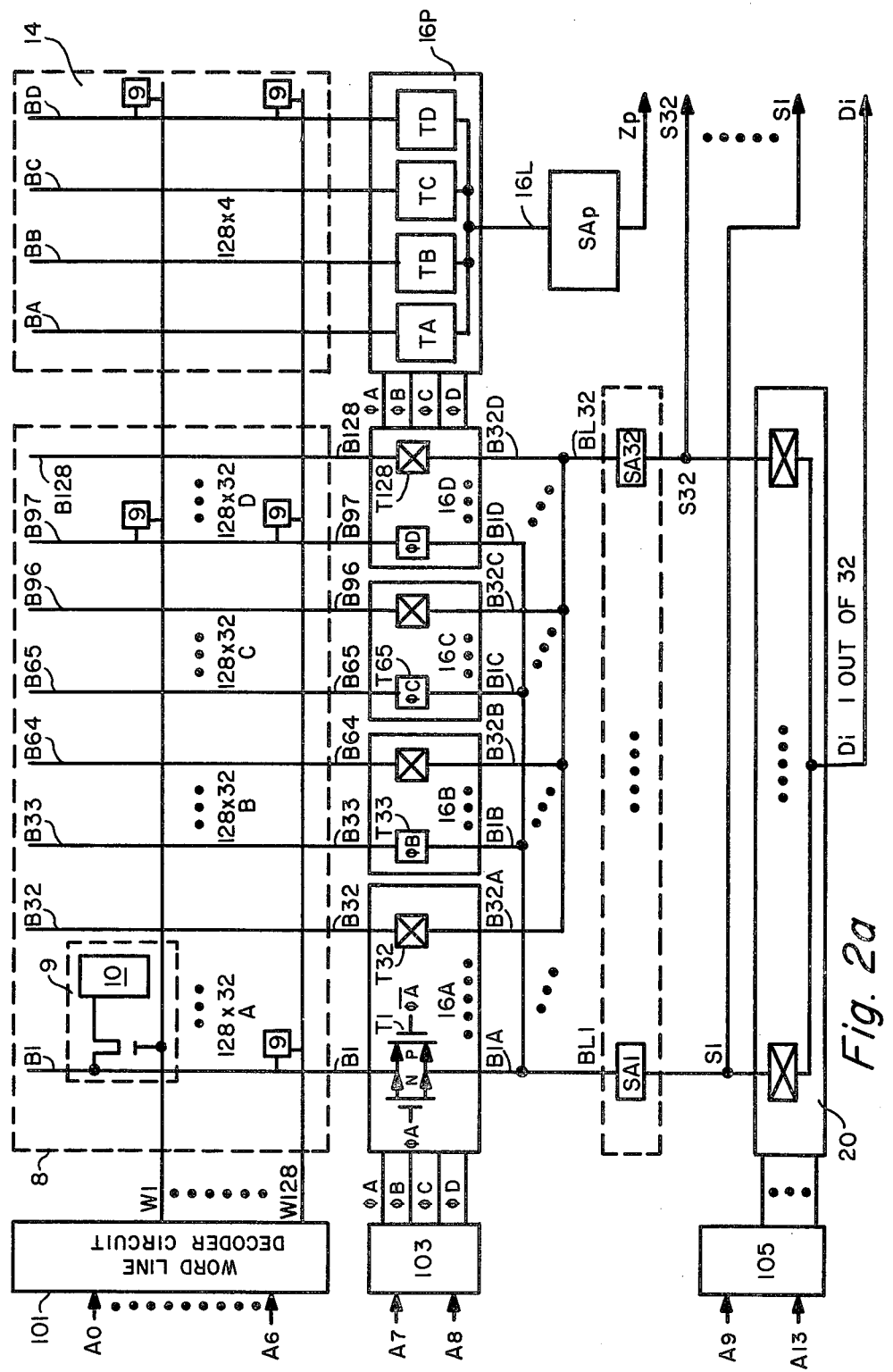
FIGS. 2A, 2B and 2C are diagrams of portions of a subsystem embodying the invention.
Figure 2B:
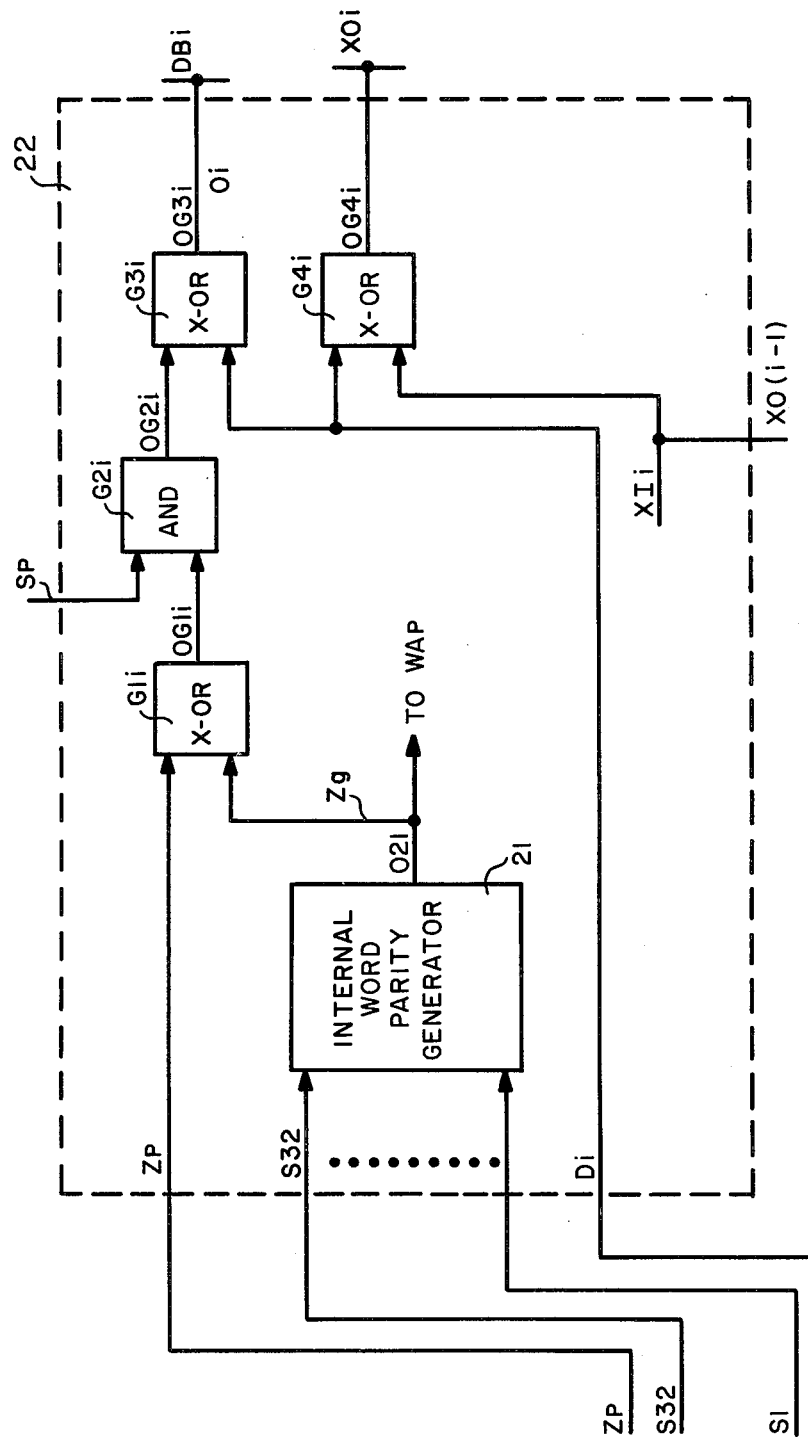
Figure 2C:
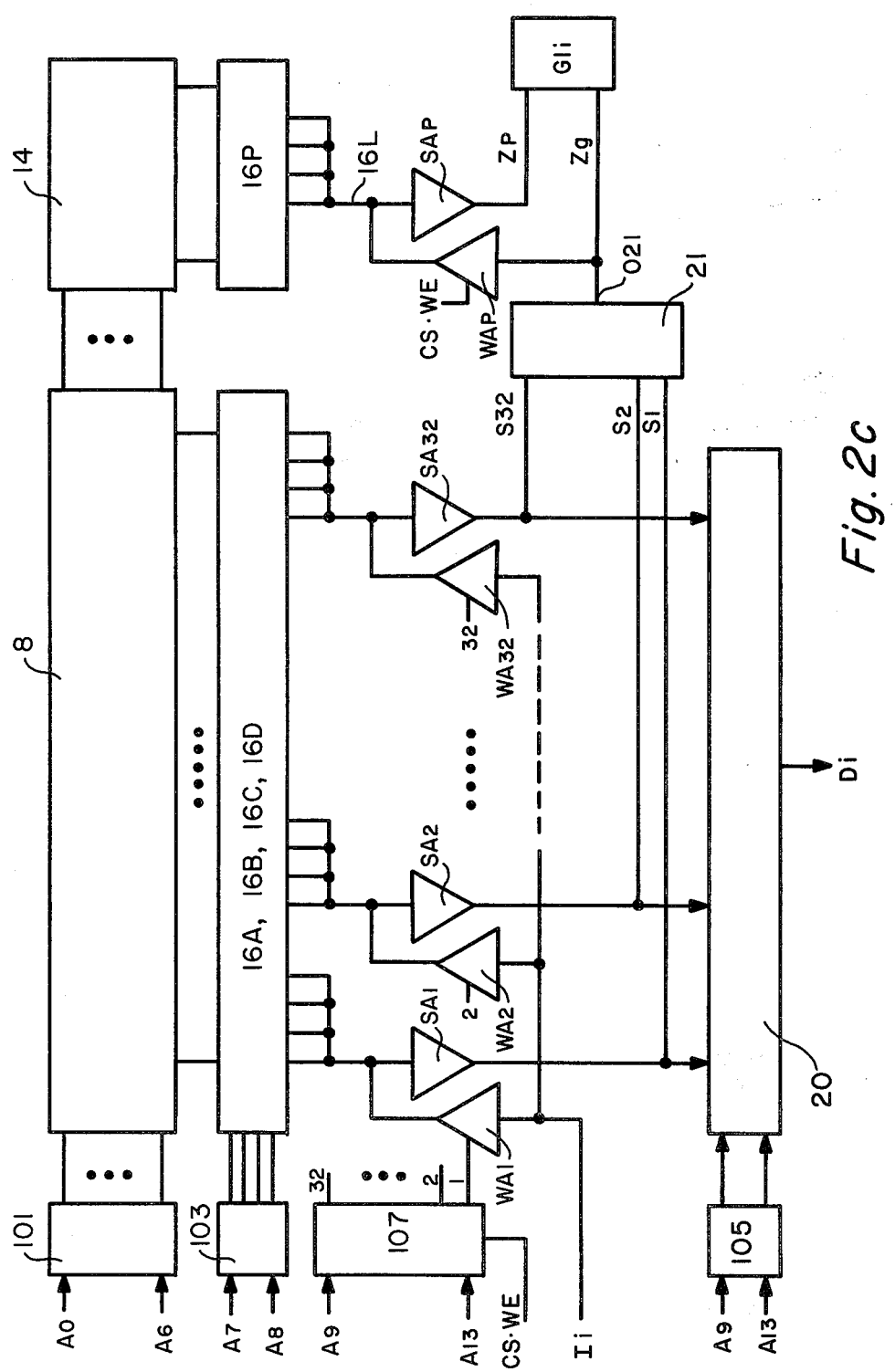

The operation of the system of FIG. 1, as well as some significant features in the construction and partitioning of the chips, or modules, to form a memory system having a two level parity error-correction code is best understood by first examining FIGS. 2A, 2B, and 2C which detail part of the contents of each one of the chips M1 through M9.

Figure 3:
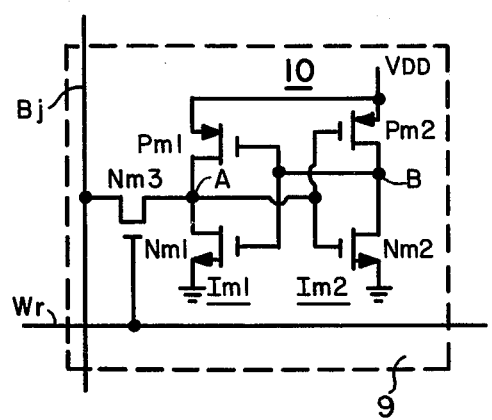
FIG. 3 is a schematic diagram of a memory cell which can be used to practice the invention.

As shown in FIGS. 2A, 2B and 2C each Integrated Circuit (or chip) M1 through M9 includes:

(1) A Random Access Memory (RAM) array 8 comprised of 16,384 memory cells 9 arranged in 128 rows (words) and 128 columns (bits). There is a word line (Wr) per row of cells and a bit conductor (Bj) per column of cells. Each row of array 8 is partitioned into 4 "internal" words or sections, respectively designated A, B, C, and D, of 32 bits (columns). So organized, array 8 is effectively partitioned into 512 (i.e. 128×4) "internal" words of 32 bits each. In array 8, each memory cell 9, as shown in FIG. 3, includes a gating transistor Nm3 whose conduction path is connected between a bit conductor (Bj) and the Input-Output (I/O) point (A) of a flip-flop 10 comprised of two cross coupled complementary inverters Im1 and Im2. Each inverter (Im1 and Im2) includes two IGFETs of complementary conductivity type having their source drain paths connected in series between $V_{DD}$ and ground. The drains of IGFETs Pm1 and Nm1 forming inverter Im1, are connected in common with the gates of IGFETs Pm2 and Nm2 to I/O point A also defined as the "exterior" node of the cell. The drains of Pm2 and Nm2, forming inverter I2, are connected to the gates of Pm1 and Nm1 at node B also defined as the "interior" node of the cell. A word line (Wr) is connected to the control (gate) electrodes of all the Nm3 transistors of a row. A potential applied to the word line controls the conductivity of Nm3. The drain/source electrodes of all the Nm3 transistors in a column are connected to the bit conductor (Bj) of the column. Cell 9 is a static cell but it should be evident that a dynamic cell, a non-volatile cell, or any other suitable storage cell could be used instead.

(2) A parity array 14 having 512 bit locations at which are found memory or storage elements which may be of the same type as those in array 8 or which may be any other suitable data storage devices. Each bit location of array 14 stores a parity bit corresponding to an "internal" 32-bit word of array 8. Array 14 is arranged in 128 rows and 4 columns, the elements of each row of array 14 being connected to a row (word line) conductor connected to a corresponding word line conductor of array 8, and the elements of each column of elements being connected to a column (bit) conductor, $B_A$, $B_B$, $B_C$, and $B_D$. Each bit conductor of array 14 corresponds to a like lettered section in array 8; for example, $B_A$ corresponds to section A of array 8, $B_B$ to section B and so on.

(3) A word line decoder 101 to which 7 address bits ($A_0$ to $A_6$) are applied is coupled to the row conductors of arrays 8 and 14. Each of the 128 addresses $A_0$–$A_6$ corresponds to a different row aand in response to each different address, decoder 101 enables a different row of the 128 rows of arrays 8 and 14.

(4) An internal word and parity bit selector 16, comprised of sections 16A, 16B, 16C, 16D and 16P is coupled to arrays 8 and 14 for selecting a particular "internal" word and its corresponding parity bit. Selector 16 is controlled by an internal word predecoder 103 to which two (2) address bits ($A_7$ and $A_8$) are applied. These two address bits ($A_7$ and $A_8$) determine which one of the four sections (i.e. which group of 32 bits) of array 8 and which column conductor of array 14 are respectively coupled to the thirty-two bit lines (BLj) and to the parity line 16L. Selector 16 includes one transmission gate per bit conductor in arrays 8 and 14. Selector 16 is partitioned so that corresponding to each section (A, B, C, D) of array 8 there is a corresponding section (16A, 16B, 16C and 16D). Under the control of address bits $A_7$ and $A_8$ and decoder 103 only one of sections A, B, C, and D is turned-on at any one time, whereby only 32 (one section) of the 128 bit conductors of array 8 are coupled, at any one time, via transmission gates to the 32 bit lines (BL1 through BL32). Similarly, the 4 bit conductors of parity array 14 are multiplexed via corresponding transmission gates $T_A$, $T_B$, $T_C$ and $T_D$ in section 16P onto parity line 16L. Only one of $T_A$, $T_B$, $T_C$ and $T_D$ is turned-on at any one time, being turned-on only when its corresponding like lettered group 16A, 16B, 16C or 16D is turned-on. The signal on line 16L is applied via an amplifier $SA_P$ to one input of a two-input Exclusive-OR gate G1i. Thus, when a 32 bit word is read-out of array 8 onto bit lines BL1 through BL32, a parity bit (Zp) stored in array 14 corresponding to that word is read-out onto line 16L and applied to gate G1i.

(5) 32 sense amplifiers and latches (SAj) coupled to the bit lines for amplifying the 32 bits of a selected "internal" 32 bit word. The signals on bit lines BLj are amplified by their corresponding sense amplifiers SAj to produce well defined binary levels at their Sj outputs. That is, either a "low" level is produced, where the low level is a voltage at or close to ground potential which is arbitrarily defined as logic "0" or "0"; or a "high" level is produced, where the high level is a voltage at or close to $V_{DD}$ volts which is arbitrarily defined as logic "1" or "1", and where $V_{DD}$ is assumed positive with respect to ground.

(6) A bit decoder 20 is coupled between the Sj outputs and a data bit output for selecting a single "raw" data bit (Di) out of a selected "internal" 32-bit word and producing the "raw" data bit output (Di). Output Di is denoted herein as "raw" because it is coupled to error correction circuitry (G3i) before being applied to the chip output (Oi) from which it is coupled via its data bus (DBi) to a a microprocessor (not shown) or other data handling systems "external" to the memory chip.

(7) A bit predecoder 105 to which are applied 5 address bits ($A_9$ to $A_{13}$) is coupled to decoder 20 and controls bit decoder 20 to select a particular data bit out of the 32 bit "internal" word.

(8) A logic section 22 for parity generation and checking, error detection, and error correction, is shown in FIG. 2B. Logic section 22 includes a parity generator 21 having 32 inputs to which are applied the 32 Sj signals. Therefore the 32 bits of a selected internal word are applied, after amplification, to generator 21 which has an outut (O21) at which is produced a signal Zg which represents the parity of the 32 bit "internal" word. The output Zg of generator 21 and the corresponding parity bit Zp derived from the output of the internal word parity selector 16P are applied to the two inputs of gate G1i. The elements 21 and X-OR gate G1i together comprise a parity checker. The output (OG1i) of G1i and the system error indicator (SP) signal are applied to the two inputs of an AND gate G2i. The output (OG2i) of gate G2i and the "raw" Di output are applied to the inputs of a two-input Exclusive-OR gate G3i whose output (Oi) is the "corrected" chip output applied to the corresponding data bus (DBi) line. The raw Di output and the XIi input signal [i.e. where XIi is the XO(i−1) output of a preceding chip] are applied to the two inputs of an Exclusive-OR gate G4i to produce a signal (XOi) which indicates the parity of the combination of XIi and Di. As discussed below, this circuitry may be used to generate a signal indicative of the parity of all the raw data bits Di read-out from the subsystems.

Circuitry needed to write information into memory 8 and parity array 14 is shown separately in FIG. 2C to simplify the drawings.

Referring to FIG. 2C, when a new data bit Ii is to be written into the memory 8 a decoder 107 is first energized in response to the logical product of a chip select (CS) and write enable (WE) signal (indicated by the AND function CS·WE legend on the input line). The logical product signal may be supplied from a microprocessor or other source (not shown). Decoder 107 has 5 address bit inputs (A9 through A13) and 32 outputs. Each one of the 32 outputs is connected to a different write amplifier (WAj). The write amplifiers are connected at their inputs to an input signal line and at their outputs to a bit line BLj. They are, preferably, low output impedance tri-state devices capable of overriding and overwriting the information on their associated bit lines. In response to a particular combination of the 5 address bits A9 through A13 applied to its inputs, decoder 107 enables one of the write amplifiers.

It should be noted that during a write cycle (in fact, just before a new bit is actually written into a memory location) a read is performed. That is, an internal word corresponding to addresses $A_0$ through $A_6$ and $A_7$ through $A_8$ is read-out onto the bit lines (BLj). The selected write amplifier in response to Ii, writes over the information read-out on its associated bit line. The information on the 32 bit lines thus includes 31 old bits of information and one new bit of information.

Consequently, when a new data bit is being written into a chip, the data bit being written becomes part of an "internal" word. The "new" internal word is coupled via the SAj amplifiers to parity generator 21. A new parity bit corresponding to the parity of the "new" internal word is generated at the output O21 of parity generator 21, which is the same parity generator 21, used during the read cycle. (However, it should be evident that a different parity generator could be used.) The "new" parity bit Zg at the output of generator 21 is applied via a write amplifier WAp onto line 16L and is then written and stored in a given location of parity array 14 corresponding to the location of the selected internal word. Note that WAp is controlled by the logical product CS·WE signal (the same signal as applied to decoder 107), whereby WAp is on regardless of which WAj amplifier is selected by decoder 107.

Concurrently with the writing of a data bit Ii into chip Mi (FIG. 1), the information of the other 7 data but lines (DB) will be similarly written (if new) or rewritten (if old) in the corresponding bit locations of their arrays. [During a write cycle Ii=Di=Oi.] Hence a "new" system data word will be written into the memory system.

When a "new" system data word is written into the memory system, a system parity bit corresponding to the system data word is generated and stored in a given location of memory M9. By way of example, the 8 bit data word (D1 through D8) appearing on the 8 bit data bus line (DB1 through DB8) is applied to the corresponding inputs (Ii) of the 8 memory storage chips (M1–M8), all of which are energized by chip select and write enable signals. Since the same addresses are applied to all the chips of the system, the 8 bits of the system data word are written into corresponding bit locations of memory chips M1 through M8. The parity of the 8 bits of the system data word is generated (using gates G4i of each chip as shown in FIG. 4) and written into a corresponding bit location of system parity chip M9.

Figure 4:
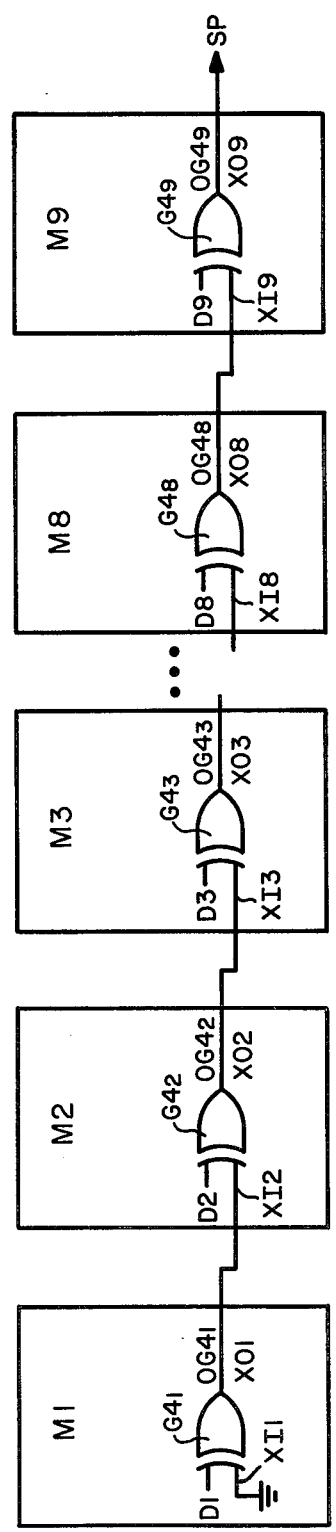
FIG. 4 is a diagram of a portion of the system of FIG. 1 detailing a "daisy chain arrangement"

For the configuration of FIGS. 1 and 4, the output OG48 will be a "0" if there are an even number of "1's" in the "new" system data word I1 through I8, or D1–D8, and OG48 will be a "1" if there are an odd number of "1's" in the "new" word. Since, during write, XO8 is the signal applied to I9 and since I9 in turn is written into the memory array 8 of M9, the system parity bit written into M9 in a location corresponding to that of the new system data word, will have the same binary value (i.e. match) as the output OG48 of chip M8. Consequently, during a subsequent read cycle the data bit output D9 of M9 should always have the same binary value as the signal at XO8 (which is equal to XI9), if there are no errors in the 9 data bits D1–D9. The no error condition is indicated by SP being low. If there is a system parity error (i.e. the value of XO8 or XI9 is not equal to the value of D9), SP will be high.

As discussed above, it is assumed that the RAM array 8 of each chip is organized into internal words, each having a length of 32 bits and that corresponding to each internal word there is a parity bit stored in array 14. Whenever a particular data bit location is addressed and its bit is to be read-out, the 32 bit internal word in which the particular data bit is contained is read-out and is applied to the inputs of a parity generator 21. The output Zg of the parity generator 21 indicative of the parity of the internal word is applied to X-OR gate G1i. The parity bit Zp stored in array 14 corresponding to the 32 bit internal word is also read-out and is applied to the other input of gate G1i.

Concurrently, the 32-bit internal word is further decoded in decoder 20 to produce at the output of 20 the particular "raw" data bit (Di) corresponding to the 14 address bits applied to the system. The output, OG1i, of G1i indicates whether there is a match between the parity of the 32 bit internal word and its corresponding parity bit. As shown in Table 1 below, if OG1i is a logic "zero", a match is indicated and there is not error in the "internal" 32-bit word read-out of the memory. That is, the word read-out on lines S1 through S32 has the same parity as the word previously written into the 32 bit locations. If OG1i is a "1", it indicates that an error exists when the parity of the "internal" word read-out of array 8 is compared with its corresponding parity bit stored in array 14. OG1i indicates the status of the parity of the "internal" word at the chip or subsystem (module) level. Therefore OG1i functions as an error flag indicating whether an error exists in one of 33 bits, where the 33 bits include the 32 bits of the "internal" word read-out and its corresponding parity bit.

TABLE 1

| $Z_g$ | $Z_p$ | OG1i | |
|---|---|---|---|
| 0 | 0 | 0 | Match - No Error |
| 1 | 0 | 1 | Error |
| 0 | 1 | 1 | Error |
| 1 | 1 | 0 | Match - No Error |

OG1i and a system error indicator signal (SP)—whose generation is described below—are applied to AND gate G2i. When SP is high ("1") it indicates that the parity of the 8 "raw" data bits (D1 through D8) read-out from M1 through M8 does not match the parity (D9) of the data word stored in M9 (i.e. there is an error at the "system" level). When SP is low ("0") the parity of the 8 "raw" data bits read-out from M1 through M8 matches the parity of the data-word stored in M9. Therefore, output OG2i of G2i indicates whether or not there exists a system error *and* a subsystem error as set forth in Table 2 below.

TABLE 2

| Subsystem Parity—OG1i | System Parity—(SP) | OG2i |
|---|---|---|
| "1"—(Subsystem Error) | "1"—(System Error) | "1" System and Subsystem Error |
| "1"—(Subsystem Error) | "0"—(No System Error) | 0 |
| "0"—(No Subsystem Error) | "1"—(System Error) | 0 |
| "0"—(No Subsystem Error) | "1"—(No System Error) | 0 |

When OG2i is high ("1") it indicates that a system error exists *and* that a subsystem error exists. The error in a 32 bit internal word indicated by OG1i being high is narrowed down or localized to a particular data bit since SP is also high. This conclusion is based on the assumption that there is only a single error in an internal word and/or a single error in a data-word. Since the particular error bit has been located its correction can be effectuated as described below.

When OG1i is high and SP is low, there is an error in an internal 32-bit word read-out of the chip but there is no error in the particular data bit Di being read-out of that chip. Likewise when OG1i is low and SP is high, there is an error at the system level but the particular 32-bit "internal" word read-out of the chip (or subsystem) is not in error.

Returning to the condition when OG2i is high, since a particular error bit has been located it can be corrected. This is achieved by applying Di and OG2i to the two inputs of Exclusive-OR gate G3i to produce an output Oi. As noted in Table 3 below, when OG2i is high Oi is made the inverse of Di. Therefore, a single error in the system is corrected. That is, Oi becomes the corrected version of Di. When OG2i is low, Oi is equal to Di, and the binary value of the data bit Di at the output of decoder 20 is applied to its corresponding data bus (DBi).

TABLE 3

| Di | OG2i | Oi | |
|---|---|---|---|
| 0 | 1 | 1 | $Oi = \overline{Di}$ |
| 1 | 1 | 0 | |
| 0 | 0 | 0 | $Oi = Di$ |
| 1 | 0 | 1 | |

The generation of the system parity signal (SP) is best explained by reference to FIG. 4 which shows the "daisy-chain" interconnection of the Exclusive-OR gates G4i located on each chip. Each gate G4i has two-inputs Di and XIi; where Di is the raw data bit read-out of the chip and XIi is the XO(i−1) output of the preceding chip [except for the first chip (M1) of the system]. So connected the XOi output of each chip indicates the parity of the "raw" data bit (Di) of the present chip when combined with the parity of the raw data bits outputted from preceding chips. Thus, during a read cycle the output OG48 (XO8) from G48 will be "low" if there is an even number of "one's" in the data word (D1 through D8) and OG48 will be "high" if there is an odd number of "one's" in the data word. Recall, that during a write cycle the parity of the data word written into a particular bit location in each of the 8 memory chips (M1-M8) is sensed and a parity bit representative thereof is generated and stored in a corresponding bit location of system parity chip M9. Thus, if during a read cycle, there is no error in the bits D1-D8 forming the system data word and in system parity bit D9, the output OG48 (XO8) should match the output D9 from M9 and the XO9 output from G49 also designated as the SP signal should be a logic "zero". Lack of match between XO8 and D9 (indicative of an error in the data word and/or the stored system parity bit) results in the SP signal being a "1" or high level. Thus, as mentioned above, the SP signal functions as the second level parity error detector, and may be used in conjunction with the first parity signal to correct errors.

As discussed above, the output XO9 of G49 is applied simultaneously to the system parity input (SP) of the main memory chips M1 through M8. The coincidence of a second-level parity error signal with an internal (subsystem) parity error signal results in the correction of the faulty data bit being generated in the offending subsystem. As noted above, the correction occurs by means of logic gates G1i, G2i, and G3i.

The "daisy chain" interconnection scheme, whereby the XOi output from chip Mi is fed to the XI(i+1) input of chip M(i+1), enables each chip to be identical to the other and enables the complete integration of the fault detection and correction function on each chip. Although a delay that is proportional to the number of bits in a data bit word will occur through the serial connection of gates G4i it is not overly significant for 8 and 16 bit words. The benefits of eliminating peripheral devices and simplifying circuit board wiring outweigh the speed penalty. Moreover, the system user retains the option of connecting the XOi outputs from each chip in parallel, or some optimum serial-parallel combination, to a parity generator chip in order to minimize the delay for very wide words.

In FIGS. 1 and 2 a novel subsystem partitioning scheme is disclosed for a two-level parity error correcting system which enables the overall system to be constructed entirely with a simple interconnection of identical subsystem building blocks. Each chip or module is organized internally as a two-dimensional plane of storage elements. A data bit stored in RAM array 8 is accessed by applying specific addresses (internal bit and word addresses) that intersect at the desired storage location. Although externally each RAM can display or put-out only a single data bit, internally every bit in a row or column selected by a word address is available for data processing. In this case, the selected bits of an internal word are used to generate a parity bit which is stored in an internal parity array during a write cycle, and compared against a previously stored parity bit during a read operation. In addition, the data bit outputted from each module is combined with that of every other module to generate a system parity which is stored in a redundant RAM (in module a) during a write cycle.

Because of the unique system partitioning scheme of each module the redundant memory chip M9 is identical to the other memory chips and together with the other 9 modules forms a complete error correction system with no additional components. The second level parity is generated through a daisy-chained arrangement of exclusive-OR gates contained on each chip and requires only a single connection between devices. During a memory read operation, the second level parity is exclusive-OR'ed with the stored parity in the redundant module M9. The resultant signal (XO9) provides a single control line connected in parallel to all data memory modules (M1–M8). These internally contain circuitry to effect an output data correction when the simultaneous presence of an external and internal parity error is detected. The addition of a single redundant device to an 8 bit data bus using $16K \times 1$ memory devices implies an external overhead of 12.5% which in addition to internal overhead brings the total system redundancy requirement to 15.5%. This compares very favorably to the Hamming code which requires 5 check bits for an 8 bit word for an overhead of 62.5%. Analysis of system reliability shows that the two-level parity code can approach the Hamming code in providing a dramatic improvement in memory failure rates.

For ease of illustration it has been assumed that match (e.g. Zg=Zp or XO8=D9) indicates no error. However, it should be understood that the system can be designed so that the complementary condition (i.e. no match) indicates no error and a matching condition is indicative of an error.

Figure 5:
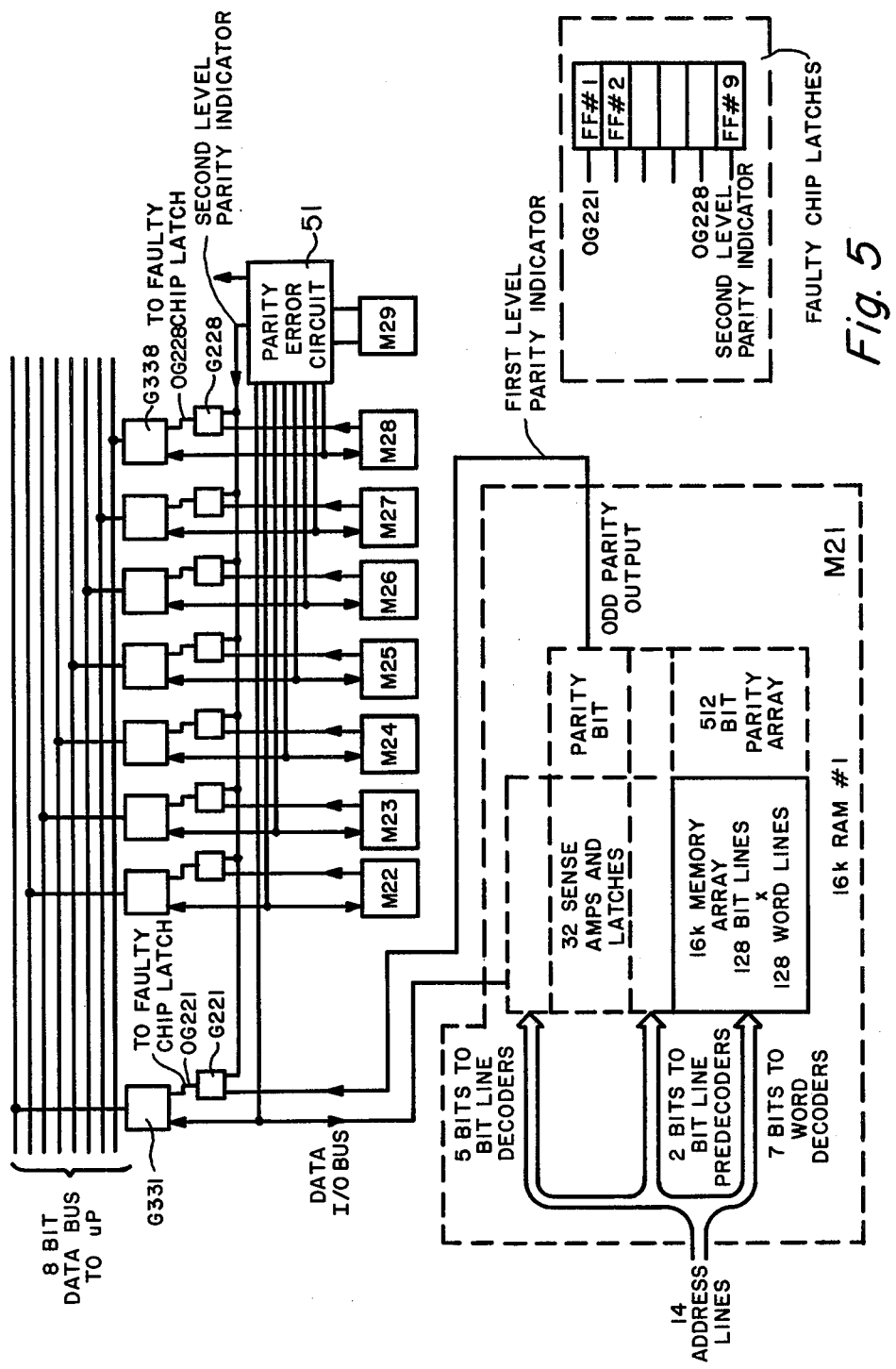
FIG. 5 is a block diagram of another system embodying the invention.
Figure 6:
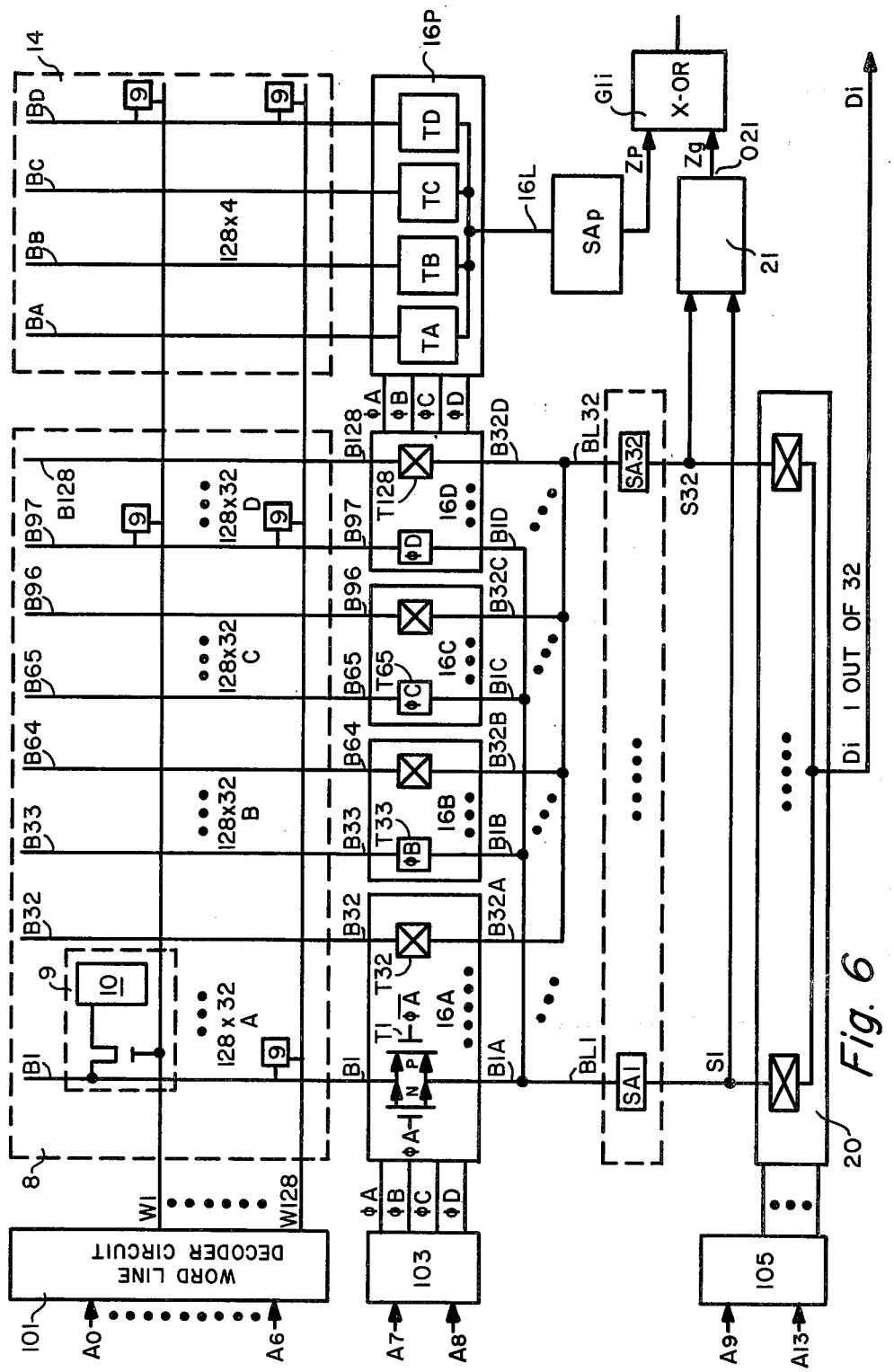
FIG. 6 is a diagram of a portion of a subsystem for use with the system of FIG. 5.

The system of FIG. 5 like that of FIG. 1 includes 9 memory modules (M21 through M29) with eight of the modules (M21 through M28) being dedicated to memory storage and the ninth module (M29) being dedicated to system or data word parity storage. Each of the 9 chips M21 through M29 of FIG. 5 as shown in FIG. 6, like those of FIG. 1, includes as shown in FIG. 6: a memory array (e.g. 8) a parity array (e.g. 14), aa word decoder (e.g. 101), a bit line predecoder (e.g. 103) and selector (e.g. 21), a parity amplifier (e.g. SAp), and an Exclusive-OR gate (e.g. G1i) responsive to the outputs (e.g. Zg and Zp) of the parity generator and parity amplifier for producing a first level parity output signal (e.g. OG1i) indicative of the parity of a selected internal word. However, in the system of FIGS. 5 and 6 the error correction circuitry and the system parity circuitry detailed in FIG. 2B is not located or integrated within modules (chips) M21 through M29.

The system parity signal is generated by means of a system parity generator and checker circuit (SPEC) 51 which may be any one of a number of known circuits for generation during write, a parity bit which is stored in module M29 and for producing, during read, a parity signal indicative of the parity of the 8 data bits (Di) produced at the I/O outputs of the bit decoders of memory chips M21 through M28 and the corresponding parity bit from module M29 which are applied to SPEC 51.

The system error correction circuitry includes two two-input logic gates (G22i and G33i) per data bit Di (or module Mi). G22i is a gate performing the AND function similar to G2i of FIG. 2B and G33i is an Exclusive-OR gate similar to gate G3i of FIG. 2B. The system parity output signal (SLIP) of circuit 51 which is the system or second level parity indicator is applied to one input of gates G22i. The second input to each one of gate G22 i is the first level parity indicator (FLIPi) produced at the OG1i output of its corresponding module M2i. The output OG22i of gate G2i is applied to one input of gate G33i whose other input is the data bit Di. The output of G33i is connected to its corresponding data bus line DBi. The output OG22i is used to indicate when there is a system and an internal error. When the first and second level parity indicate the presence of an error, OG22i causes G33i to function as an inverter and to then invert ("correct") the data applied to DBi. This operation is similar to that described for G2i and G3i in FIGS. 1 and 2 and need not be detailed. The OG22i outputs are connected to respective flip-flops (FF#1–FF#9) which function as faulty chip latches. The output of these flip-flops are used to indicate which module of the memory system is faulty and thence to make repair or replacement of a faulty chip very easy.

A feature of the system of FIG. 5 is that the system parity error signal is generated by having the outputs of the memory modules applied in parallel to the parity error circuit 51. This enables the system to operate with significantly greater speed than the memory system FIG. 1. Another advantage of this system is that it can protect against catastrophic failure of any one of the chips (M2i) of the system. The disadvantage of the circuit is that the error circuit 51 and the circuitry containing the logic gates for correcting the data bits require a separate chip or module.

The proposed system of FIGS. 1 and 5 can correct many scattered single errors like those resulting from Alpha particles, as well as multiple errors occurring within a single chip caused by shorted bit or word lines, or a faulty sense amp. The system is also faster and more flexible than Hamming code systems. While physically working with word lengths of only 32 bits and 8 bits, the effective or virtual word length is 256 bits which allows for low overhead. The overhead for the 8 chip system in this example is approximately 15% compared to approximately 62% for a Hamming code solution. The memory systems of FIGS. 1 and 5 may be classified as being of the type which enable detection of two errors and the correction of a single error. However, during any one cycle the system operates basically on 297 bits ]9 modules×(32 data bits+1 parity bit)]. Thus, unless more than two errors are present in the same 297 bit field, the system may correct numerous errors.

In the systems of FIGS. 1 and 5 and in the modules shown in FIGS. 2 and 6 a problem exists when a new bit of information is to be written into an internal word which previously contained an error. For example, when a new data bit is written into a 32 bit wide word, a new parity bit is concurrently generated based on the status of the one "new" data bit and the 31 "old" (stored) data bits. The previous parity bit is erased and replaced with a parity bit determined by the current state of the 32 bits, which the new parity will affirm to be correct. Hence, a problem exists since the information represented by the 31 old data bits may contain an error. This problem may be solved by incorporating an additional latch array on each module to permanently store the occurrence of a parity error in an internal word. The problem and solution are more fully set forth in copending application Ser. No. 362,464 titled MEMORY SYSTEM WITH ERROR STORAGE assigned to the same assignee and filed contemporaneously herewith and whose teachings are incorporated herein by reference.

Conceptually, the two level parity code exhibits a high degree of parallelism compared to a Hamming type code in the sense that much of the error detection processing occurs concurrently with data access. It also permits a redistribution of the error code related circuit functions among the individual chips to achieve an overall system performance improvement. This is consistent with the trend in VLSI systems design where the increased circuit capability is used to build in more concurrent data processing.

What is claimed is:

1. A memory system comprising:
M modules, each module including:
 (a) a memory array of R·C memory cells partitioned internally into W internal words of L bits each and organized for external read as a memory of X words each of Y bit length, where Y is an integer equal to or greater than one, where L is greater than Y, and R·C=W·L=X·Y;
 (b) means for reading-out a selected one of said X words of Y bit length and for concurrently reading the internal word in which the selected X word of Y bit length is included;
 (c) a parity array for storing a parity bit for each internal word; and
 (d) means receptive of a selected internal word and its corresponding parity bit for ascertaining whether its parity is correct and for producing a first signal indicative thereof; and
means receptive of a selected X word of Y bit length from each of said M modules for ascertaining whether the parity of the selected X word of Y bit length read from the M modues is correct and for providing a second output signal indicative thereof.

2. The memory system as claimed in claim 1 further including within each module:
a data output line;
controllable means responsive to a control signal and to said X word of Y bit length for coupling data signals corresponding to said X word of Y bit length onto said data bit line;
means responsive to said first output signal when it is indicative of a parity error in a selected internal word and to said second output signal when it is indicative of a parity error for producing a control signal applied to said controllable means for correcting the selected X word of Y bit length coupled onto said data line.

3. The memory system as claimed in claim 2 wherein M−1 of said M modules are for storing information and wherein the Mth module is for storing the parity information of the X words of Y bit length in said M−1 modules, the parity of the X word of Y bit length from said M−1 modules being stored in corresponding locations of said Mth module.

4. The combination as claimed in claim 3 wherein Y is equal to 1.

5. The combination as claimed in claim 1 wherein each one of said M modules is an integrated circuit on which is formed said memory array, said parity array, said means for reading said selected Y bit words, and said means receptive of a selected internal word and its corresponding parity bit.

6. In a memory system comprising M memory modules, each module storing W words of L bits, where L is an integer greater than one, an arrangement for detecting and correcting errors comprising, in combination:
means receptive of a selected L bit word read from a selected one of the memory modules for ascertaining whether its parity is correct and for producing a first output signal indicative thereof;
means for reading-out from each one of said M modules a bit selected from one of the bits in said selected L bit word, said means for reading-out also including controllable output means, for coupling said selected bit to an output terminal;
means for ascertaining whether the parity of the M bits read from said M modules is correct and for providing a second output signal indicative thereof; and
means in each module responsive to its said first output signal when it is indicative of a parity error in the selected L bit word while said second output signal is indicative of a parity error in said M bits, coupled to said controllable output means, for correcting said selected one of the bits from said selected L bit word being coupled to said output terminal.

7. In a memory system comprising M memory modules in which selected bits from said modules are read-out in parallel to produce a system word, each module including:
 (a) a memory array of R·C memory cells partitioned internally into W internal words of L bits each and organized externally as a memory of X words each of Y bits, where Y is an integer equal to or greater than one, where L is greater than Y, and R·C=W·L=X·Y;
 (b) means for reading-out a selected Y bits and for concurrently reading the internal word in which the selected Y bits are included;
 (c) a parity array for storing a parity bit for each internal word;
 (d) means receptive of a selected internal word and its corresponding parity bit for ascertaining whether its parity is correct and for producing a first signal indicative thereof;
 (e) a control terminal adapted to receive a system parity signal having either a first value indicative of a system error or a second value indicating the absence of a system error; and
 (f) means responsive to said system error indication and to said first signal when it indicates the presence of an error within said internal word for producing an error signal indicative of the presence of both errors.

8. In the memory system as claimed in claim 7 further including means receptive to the selected Y bits from each of said M modules for ascertaining whether the parity of said Y bits from said M modules is correct and for producing said system parity signal.

9. The combination as claimed in claim 7 wherein Y is equal to one.

10. An integrated circuit (chip) suitable for use in a memory system comprising:
   a random access memory (RAM) array having R·C bit locations arranged in R rows and C columns, said RAM being organized into W "internal" words of L bits each; where W·L is equal to R·C and where R, C, W and L are digits greater than 1;
   a parity array section of W bits for storing a parity bit for each one of said W "internal" words;
   a first decoding means coupled to said RAM for selectively reading one of said "internal" words;
   a second decoding means, coupled to said first decoding means, for concurrently reading-out X data bits selected out of the L bits of said selected one of said "internal" words; where X is an integer less than L;
   means receptive of a selected internal word and its corresponding parity bit for ascertaining whether its parity is correct and for producing a first output signal indicative thereof functioning as a first level parity check for said selected X bits; and
   means for coupling said selected X data bits to X input-output terminals whereby only X of the L bits are provided externally to said integrated circuit, at any one time, for processing by said memory system.

11. An integrated circuit suitable for use in a memory system comprising:
   a random access memory (RAM) array having R·C bit locations arranged in R rows and C columns, said RAM being organized into W "internal" words of L bits each: where W·L is equal to R·C and where R, C, W and L are digits greater than 1;
   a parity array section of W bits for storing a parity bit for each one of said W "internal" words of said RAM;
   decoding means coupled to said RAM for selectively reading-out one of said "internal" words and for selectively reading-out a particular data bit (D) out of the L bits of said selected one of said "internal" words;
   parity checking means, coupled to said decoding means and to said parity array, responsive to the parity of the L bits of the selected internal word and to its corresponding parity bit for producing a first level output (OG1) signal having a first value to indicate the absence of a match (error) between the parity of the L bits and its stored parity bit and having a second value to indicate the presence of a match (no error);
   a data output terminal; and
   means coupling said particular data bit to said data output terminal.

12. A memory system comprising:
   M integrated circuits (IC's), each IC including:
   (a) a random access memory (RAM) array having R·C bit locations arranged in R rows and C columns, said RAM being organized into W "internal" words of L bits each: where W·L is equal to R·C and where R, C, W and L are digits greater than 1;
   (b) a parity array section of W bits for storing a parity bit for each one of said W "internal" words of said RAM;
   (c) first decoding means coupled to said RAM for selectively reading one of said "internal" words and for reading-out a particular data bit (D) out of the L bits of said selected one of said "internal" words; and
   (d) parity checking means, coupled to said decoding means and to said parity array responsive to the parity of the L bits of the selected internal word and to its parity bit for producing a first level output signal having a first value to indicate the absence of a match (error) between the parity of the L bits and the stored parity bit and having a second value to indicate the presence of a match (no error);
   means responsive to the particular data bits read-out of said M integrated circuits for ascertaining whether their parity is correct and for providing a second output signal indicative thereof; and
   means on each IC coupling a particular data bit to a corresponding data bus, said means being responsive to the first output signal of its integrated circuit and to said second output signal for inverting said particular data bit when its first output signal and said second output signals are indicative of parity errors.

13. In a memory system comprising M modules, each module including a memory array, an arrangement for detecting and correcting errors comprising, in combination:
   means for partitioning the memory array of each module into W internal words, each word having L bits;
   means for providing within each module a parity array for storing a parity bit corresponding to each internal word;
   means for reading out from each module a selected bit and for concurrently reading the internal word which includes said selected bit;
   means within each module receptive of a selected internal word and its corresponding parity bit read for ascertaining whether its parity is correct and for producing a first output signal indicative thereof;
   means receptive of a selected bit read-out from each one of said M modules for ascertaining whether the parity of the M bits read from said M modules is correct and for providing a second output signal indicative thereof;
   means responsive to said first output signal when it is indicative of a parity error in the selected internal word while said second output signal is indicative of a parity error in said M bits, coupled to said means for reading out from each module a selected bit, for correcting said selected bit read-out from said module whose first output signal is indicative of a parity error.

* * * * *

UNITED STATES PATENT AND TRADEMARK OFFICE
CERTIFICATE OF CORRECTION

PATENT NO. : 4,464,755
DATED : Aug. 7, 1984
INVENTOR(S) : Roger Green Stewart et al.

It is certified that error appears in the above-identified patent and that said Letters Patent is hereby corrected as shown below:

Col. 2, line 14, change "each" to - - - ease - - -.
Col. 3, line 34, insert quotation marks (") after the word "internal".
Col. 6, line 6, change "but" to - - - bus - - -.
Col. 6, line 65, change "not" to - - - no - - -.
Col. 9, line 56, change "aa" to - - - a - - -.
Col. 10, line 17, change "G22 i" to -- G22i --.

Signed and Sealed this

Twenty-third Day of April 1985

[SEAL]

Attest:

DONALD J. QUIGG

Attesting Officer

Acting Commissioner of Patents and Trademarks